United States Patent Office 2,808,094
Patented Oct. 1, 1957

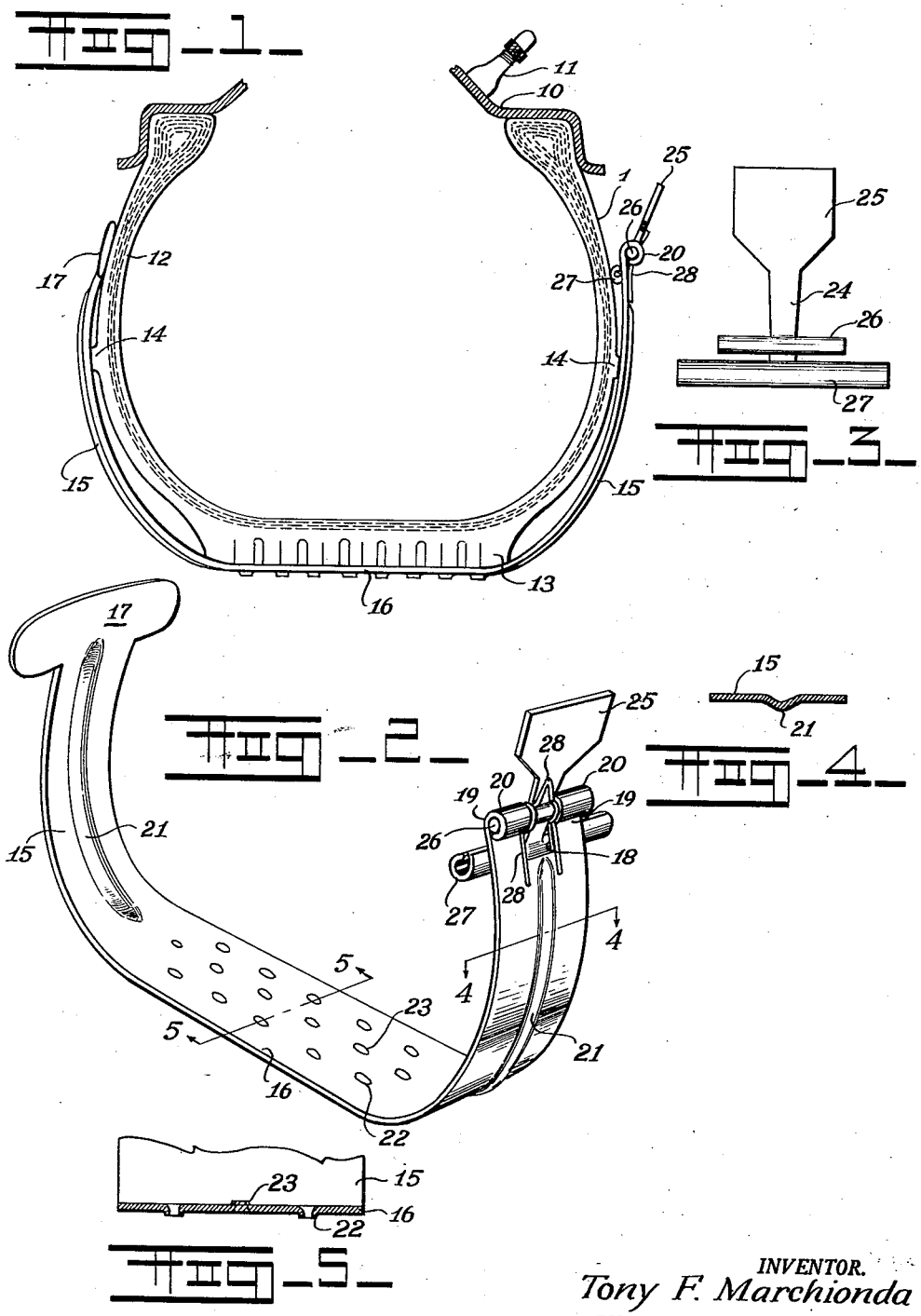

2,808,094

TRACTION DEVICE

Tony F. Marchionda, Struthers, Ohio

Application January 27, 1955, Serial No. 484,461

4 Claims. (Cl. 152—226)

This invention relates to a traction device and more particularly to a traction device taking the form of a clamp engageable about a tire on an automobile.

The principal object of the invention is the provision of a traction device attachable to an automobile wheel to provide traction on ice and snow.

A further object of the invention is the provision of a simple and inexpensive traction device which may be readily installed on an automobile tire.

A still further object of the invention is the provision of a traction device comprising a U-shaped member engageable about an automobile tire and having means movable inwardly of the device for frictionally engaging said tire to secure the device thereon.

A still further object of the invention is the provision of a traction device having means for engaging an icy surface to maintain traction and means for engaging the tread portion of a tire on which the device is attached.

A still further object of the invention is the provision of a traction device for an automobile tire and having an eccentric clamp movable into and out of engagement with said tire for securing the device thereto.

The traction device disclosed herein comprises an improvement in the art relating to such devices and particularly with respect to the means for securing the traction device to the tire and the means by which the traction device establishes non-slip engagement with an icy surface as well as with the tread of the tire on which it is positioned.

Traction devices heretofore known in the art have generally comprised multiple-part devices with hinges, clamps and springs securing the several parts together in assembled relation about the outer surfaces of an automobile tire. Such devices have been cumbersome in size and shape, awkward to handle and difficult to install.

The present device is easily slipped over an automobile tire as it is formed of a single piece of appropriately shaped metal, provided with an eccentric clamp one one end thereof which is easily moved into self-retaining clamping engagement with the side of the tire and acts to secure the traction device thereon.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a cross section of a portion of a tire and a rim illustrating the traction device in position thereon.

Figure 2 is a perspective view of the traction device.

Figure 3 is an enlarged detailed plan view of the eccentric clamping member forming a part of the traction device shown in Figs. 1 and 2.

Figure 4 is a cross section taken on line 4—4 of Fig. 2.

Figure 5 is a cross section taken on line 5—5 of Fig. 2.

By referring to the drawings and Figure 1 in particular it will be seen that the rim of an automobile wheel is indicated by the numeral 10 and is provided with an air filling stem 11. An inflated tire 12 is positioned on the rim 10 and includes a normally ground engaging tread portion 13. The side walls of the tire 12 include scuff ribs 14—14, which are customary in the art, and which are usually formed along the innermost portion of the tread pattern which is extended over the adjacent portion of the side wall of the tire.

As illustrated in Figure 1 of the drawings, the traction device comprises a substantially U-shaped section of suitable flat metal strip, arms 15—15 of the U-shaped sections of metal are curved inwardly longitudinally from the base of the U-shaped section being indicated by the numeral 16. One of the arms 15 has a T-shaped head 17 thereon which effectively widens the end portion thereof and provides an increased area of contact against the side wall of the tire 12. The other arm 15 terminates at its upper end in a bifurcated structure defining a slot 18 and a pair of extensions 19—19, the ends of which are rolled backwardly upon themselves to form spaced aligned journals 20—20. Both of the curved arms 15—15 of the traction device are ribbed longitudinally as at 21—21 (as best illustrated in Figs. 2 and 4 of the drawings).

The base portion 16 of the traction device is substantially flat laterally and longitudinally and conforms with the flat surface of the tread portion 13 of the tire. The base portion 16 of the traction device is provided with a plurality of punched openings which form projections extending from each flat side of said base, as indicated at 22 and 23. The metal displaced by the punching of the openings 22 and 23 is displaced in the direction of the opening and extends beyond the otherwise flat surface of the base portion 16 of the device and forms effective ice engaging cleats as well as effective tread engaging cleats.

The cleats surrounding the openings 23 may be seen in Figure 2 and also in detail in Figure 5 of the drawings. It will thus be seen that when the traction device is in position on the tire, as shown in Figure 1 of the drawing, the cleats formed around the openings 23 securely position the device with respect to the tread 13 of the tire and prevent slippage of the device therealong while the cleats surrounding the openings 22 will engage the road surface and provide adequate traction on ice.

By referring now to Figures 1, 2 and 3 of the drawings it will be seen that the journals 20—20 receive and movably retain an eccentric clamping piece 24 having a handle portion 25, a transversely extending rod 26 and a T-headed tire engaging portion 27. The transverse rod 26 is disposed in the spaced aligned journals 20—20 on the upper bifurcated end extensions 19—19 of the arm 15 with the handle 25 normally extending substantially vertically thereabove. In such position, the tire engaging portion 27 is positioned between the inner surfaces of the upper bifurcated ends 19—19 of the arm 15 and tightly against the adjacent side wall of the tire 12 and between the scuff rib 14 thereof and the rim 10. In such position, the metal of the traction device will be under tension, being sprung outwardly slightly with respect to the tire 12, and is thereby capable of securing itself in position on the tire as the distance between the enlarged end 17 on one arm 15 and the clamping member 27 on the other arm 15 is less than the overall width of the tire 12.

In order to remove the traction device, the handle 25 is forced downwardly to a substantially vertical position which moves the tire engaging portion 27 of the eccentric clamp into position above the spaced aligned journals 20—20 and out of engagement with the tire 12 so that the effective width between the arms 15—15 of the traction device is increased and it may be slipped off the tire.

It will thus be seen that the traction device disclosed herein may be easily and simply manufactured, that it is relatively small and light in weight and is therefore easily handled as upon being installed upon a tire on the wheel of an automobile.

Upon being pushed into position over the tire, the handle 25 is moved from depending position with respect to the journals 20—20 to elevated position, which action moves the tire engaging portion 27 into clamping position, springing the device, which secures the device on the tire.

It will occur to those skilled in the art that if desired a coil spring may be positioned about the transverse rod 26 with oppositely disposed ends engaged on the arm 15 and the handle 25 of the eccentric clamp 24 to normally urge the device into locked position as illustrated in Figures 1 and 2 of the drawings. Such a spring is illustrated in Figure 2 of the drawings and indicated by the numeral 28.

It will thus be seen that the several objects of the invention have been met by the traction device disclosed herein.

Having thus described my invention, what I claim is:

1. A traction device comprising a substantially U-shaped member, the arms of which are inwardly curved and ribbed longitudinally, the base of the U-shaped member being substantially flat, punched openings in said flat base forming projections extending from each flat side of said base, journal means formed on one end of one of said arms, an eccentric clamp including a transversely positioned rod pivoted in said journal means, said eccentric clamp including oppositely disposed tire engaging and handle portions with said transversely positioned rod located intermediate the same, said tire engaging portion being tubular and parallel with said rod.

2. The traction device set forth in claim 1 and wherein the U-shaped member is formed of resilient metal adapted to be sprung slightly upon engagement of the tire engaging portion of the eccentric clamp with a tire on which the device is positioned.

3. The traction device set forth in claim 1 wherein spring means is positioned on the eccentric clamp and engaged against the arm carrying the same to normally urge said eccentric clamp into clamping position.

4. A traction device comprising a substantially U-shaped member engageable about a tire of an automobile and including curved arms extending over the side wall areas of the tire and conforming in shape thereto, said arms ribbed longitudinally to lend rigidity thereto, bifurcated ends on one of said arms turned outwardly upon themselves to form spaced aligned journals transversely of said arm, an eccentric clamp having a transversely positioned rod pivotally mounted in said journals, one end of said clamp being movable into and out of engagement with said tire between said tire and said arm, the base of said U-shaped mmeber being substantially flat laterally and transversely and having a plurality of pierced openings formed therein, cleats extending from each flat side of said base for engaging the tread of the tire on which the device is positioned and a road surface.

References Cited in the file of this patent

UNITED STATES PATENTS

| | | |
|---|---|---|
| 2,154,047 | Krider | Apr. 11, 1939 |
| 2,437,040 | Prevost | Mar. 2, 1948 |
| 2,518,170 | Otis | Aug. 8, 1950 |
| 2,530,108 | Whichard | Nov. 14, 1950 |
| 2,664,934 | Safran | Jan. 5, 1954 |
| 2,738,820 | Browning | Mar. 20, 1956 |